United States Patent
Ide et al.

(10) Patent No.: US 9,627,696 B2
(45) Date of Patent: Apr. 18, 2017

(54) METHOD FOR PRODUCING STAINLESS STEEL FOR FUEL CELL SEPARATOR, STAINLESS STEEL FOR FUEL CELL SEPARATOR, FUEL CELL SEPARATOR, AND FUEL CELL

(75) Inventors: Shinsuke Ide, Tokyo (JP); Tomohiro Ishii, Tokyo (JP); Shin Ishikawa, Tokyo (JP); Yasushi Kato, Tokyo (JP)

(73) Assignee: JFE Steel Corporation (JP)

( * ) Notice: Subject to any disclaimer, the term of this patent is extended or adjusted under 35 U.S.C. 154(b) by 531 days.

(21) Appl. No.: 13/979,700

(22) PCT Filed: Jan. 19, 2011

(86) PCT No.: PCT/JP2011/051378
§ 371 (c)(1),
(2), (4) Date: Jul. 15, 2013

(87) PCT Pub. No.: WO2012/098689
PCT Pub. Date: Jul. 26, 2012

(65) Prior Publication Data
US 2013/0302718 A1 Nov. 14, 2013

(30) Foreign Application Priority Data

Jan. 17, 2011 (JP) ................................. 2011-006554

(51) Int. Cl.
*C25F 3/06* (2006.01)
*H01M 8/021* (2016.01)
(Continued)

(52) U.S. Cl.
CPC ............... *H01M 8/021* (2013.01); *C23C 8/80* (2013.01); *C25F 3/00* (2013.01)

(58) Field of Classification Search
CPC .......... H01M 8/021; C23C 8/80; Y02E 60/50; C25F 3/00; C25F 1/06; C25F 3/06
(Continued)

(56) References Cited

U.S. PATENT DOCUMENTS

2003/0224236 A1 12/2003 Morita et al.
2008/0233456 A1 9/2008 Ishikawa et al.

FOREIGN PATENT DOCUMENTS

DE 103 13 920 10/2003
JP 03-028386 2/1991
(Continued)

OTHER PUBLICATIONS

Translation of JP2002-367622.*
(Continued)

*Primary Examiner* — Bryan D. Ripa
(74) *Attorney, Agent, or Firm* — DLA Piper LLP (US)

(57) ABSTRACT

A stainless steel for use in a fuel cell separator is produced by subjecting stainless steel containing 16 mass % or more of Cr to electrolytic treatment and thereafter to immersion treatment in a solution containing fluorine. The electrolytic treatment is carried out by anodic electrolyzation or by a combination of anodic electrolyzation and cathodic electrolyzation, and an anodic electrolytic quantity Qa and a cathodic electrolytic quantity Qc preferably satisfy Qa≥Qc. The solution containing fluorine preferably has a temperature of 40° C. or higher, and hydrofluoric acid concentration [HF] (mass %) and nitric acid concentration [HNO$_3$] (mass %) satisfying [HF]≥0.8×[HNO$_3$].

10 Claims, 1 Drawing Sheet

(51) Int. Cl.
*C25F 3/00* (2006.01)
*C23C 8/80* (2006.01)

(58) Field of Classification Search
USPC .................................................. 205/320, 741
See application file for complete search history.

(56) References Cited

FOREIGN PATENT DOCUMENTS

| | | | |
|---|---|---|---|
| JP | 2002-270196 A | | 9/2002 |
| JP | 2002-367622 A | | 12/2002 |
| JP | 2002367622 | † | 12/2002 |
| JP | 2003132904 A | * | 5/2003 |
| JP | 2005-166276 | | 6/2005 |
| JP | 2005-302713 A | | 10/2005 |
| JP | 2006-302731 A | | 11/2006 |
| JP | 2007-257883 A | | 10/2007 |
| JP | 2010013684 | † | 1/2010 |
| JP | 2010-13684 A | | 2/2010 |
| JP | 5621186 B2 | * | 11/2014 |
| WO | 2008/082162 | | 7/2008 |

OTHER PUBLICATIONS

Translation of JP2010-013684.*
Machine Translation of JP5621186 B2.*
Supplementary European Search Report dated Dec. 22, 2015 of corresponding European Application No. 11856235.4.

\* cited by examiner
† cited by third party

METHOD FOR PRODUCING STAINLESS STEEL FOR FUEL CELL SEPARATOR, STAINLESS STEEL FOR FUEL CELL SEPARATOR, FUEL CELL SEPARATOR, AND FUEL CELL

TECHNICAL FIELD

This disclosure relates to a method for producing stainless steel having excellent conductivity and durability for use in a fuel cell separator, stainless steel of use in a fuel cell separator, a fuel cell separator, and a fuel cell.

BACKGROUND

Over recent years, from the viewpoint of global environment conservation, a fuel cell that has excellent power generation efficiency and that does not produce carbon dioxide emissions has been in the progress of being developed. This fuel cell causes hydrogen and oxygen to react with each other to generate electricity. It has a fundamental sandwich-like structure and includes an electrolyte membrane (that is, an ion exchange membrane), two electrodes (that is, a fuel electrode and an air electrode), diffusion layers for hydrogen and oxygen (air), and two separators. Depending on the type of electrolyte used, there have been developed a phosphoric-acid fuel cell, a molten carbonate fuel cell, a solid-oxide fuel cell, an alkaline fuel cell, a proton-exchange membrane fuel cell, and the like.

Among the above-mentioned fuel cells, the proton-exchange membrane fuel cell has the following features, compared to the molten carbonate fuel cell and the phosphoric-acid fuel cell:

(1) Operating temperature is markedly low at about 80° C.
(2) A cell main body can be reduced in weight and size.
(3) Quick start-up is realized, and high fuel efficiency and output density are achieved.

Therefore, among fuel cells, the proton-exchange membrane fuel cell is the one currently receiving the most attention for use as an onboard power supply of an electric vehicle, and household use or use as a portable and compact dispersed power system (a stationary type compact electric generator).

The proton-exchange membrane fuel cell is based on a principle in which electricity is obtained from hydrogen and oxygen via a polymer membrane. As illustrated in FIG. 1, its structure includes a membrane-electrode assembly (MEA, having a thickness of several 10 to several 100 µm) 1 sandwiched by gas diffusion layers 2 and 3 such as carbon cloth and separators 4 and 5, respectively. The membrane-electrode assembly has, as a unit, a polymer membrane and an electrode material such as carbon black carrying a platinum-based catalyst on the front and back faces of the membrane. This structure is formed into a single constituent element (a so-called "single cell") to generate an electromotive force between the separators 4 and 5. At that time, the gas diffusion layers are frequently integrated with the MEA. Several tens to several hundreds of such single cells are connected in series to constitute a fuel cell stack to be used.

The separators 4 and 5 function as partition walls dividing single cells and are also desired to function as:

(1) a conductive material carrying generated electrons, and
(2) flow paths of oxygen (air) and hydrogen (an air flow path 6 and a hydrogen flow path 7, respectively, in FIG. 1) and exhaust paths of generated water and exhaust gas (the air flow channel 6 and the hydrogen flow path 7, respectively, in FIG. 1).

Further, durability is supposed to be about 5,000 hours in fuel cells for automobiles and about 40,000 hours in stationary type fuel cells used as household use compact dispersed power systems.

Proton-exchange membrane fuel cells that have been put into practical use so far have been supplied with a carbon material as a separator. However, the carbon separator has had disadvantages such as being liable to break upon impact, being difficult to reduce in size, and high manufacturing cost for flow path formation. In particular, the problem of high cost has been the largest obstacle in popularization of fuel cells. Therefore, there has been an attempt to apply a metal material, specifically, stainless steel instead of the carbon material.

As described above, the separator has a role as a conductive material that carries generated electrons and therefore needs to have conductivity. With respect to electric conductivity in use of stainless steel as the separator, since a contact resistance between the separator and the gas diffusion layer is dominant factor, some techniques to decrease the contact resistance have been investigated.

For example, Japanese Unexamined Patent Application Publication No. 2010-13684 discloses a technique in which stainless steel is subjected to immersion treatment in a solution containing fluorine ions at a rate of dissolution of 0.002 g/m²·sec or more and 0.05 g/m²·sec or less to incorporate fluorine into a passivation film on the surface to decrease contact resistance. This technique is effective in reducing the contact resistance. However, we conducted thorough investigations and found a problem that when stainless steel is dissolved by immersion treatment in a solution containing fluorine ions and then Fe ions having a concentration of 0.04 g/l (liter) or higher are mixed in the solution, the Fe ions and fluorine ions form a complex and thereby the effective amount of fluorine decreases, with the result that a predetermined effect may not be obtained. In other words, the following problems have been found: when steel sheets are treated, the number of treatable sheets is limited; and when a steel sheet in a coil is continuously treated, the treatable length is limited. Further, the following problem has been found: when this effect becomes weak, durability in a fuel cell usage environment markedly decreases.

Conventionally, as a method of maintaining the pickling power of a solution containing fluorine ions, for example, Japanese Unexamined Patent Application Publication No. 03-28386 (Japanese Patent No. 2827289) discloses a pickling treatment of metal in which the total iron concentration in a pickling solution is allowed to be 50 g/l or lower and a concentration ratio ($Fe^{2+}/Fe^{3+}$) of a divalent Fe ion ($Fe^{2+}$) to a trivalent Fe ion ($Fe^{3+}$) is controlled to be in the range of 0.25 to 2.0. However, since this technique is intended to simply maintain descale performance in a considerably high Fe ion concentration range (5 to 25 g/l in EXAMPLES), this issue largely differs from maintenance of an effect of advanced surface treatment so as to reduce contact resistance.

In view of the problems faced by conventional technology, that although immersion in a solution containing fluorine ions is effective in reducing the contact resistance of stainless steel, an effect of reducing the contact resistance may not be stably exhibited due to dissolution of the stainless steel itself being immersed in the solution, and in consideration of mass productivity, there is a need to provide a method of producing stainless steel having excellent conductivity and durability for use in a fuel cell separator, stainless steel for use in the fuel cell separator, a fuel cell separator, and a fuel cell.

SUMMARY

We discovered that when electrolytic treatment is carried out prior to immersion treatment in a solution containing fluorine, an effect of reducing contact resistance becomes easy to realize, and even when Fe ions are mixed in the solution containing fluorine, this effect does not easily disappear. In addition, we found that the thus-obtained stainless steel also exhibits excellent durability in a fuel cell environment.

We thus provide:

(1) A method of producing stainless steel for use in a fuel cell separator, in which stainless steel containing 16 mass % or more of Cr is subjected to electrolytic treatment and thereafter to immersion treatment in a solution containing fluorine.

(2) The method of producing stainless steel for use in a fuel cell separator according to item (1), in which the electrolytic treatment is carried out by anodic electrolyzation or by a combination of anodic electrolyzation and cathodic electrolyzation; and an anodic electrolytic quantity Qa and a cathodic electrolytic quantity Qc satisfy the relationship: $Qa \geq Qc$ having the relationship: $Qc=0$ in the case of electrolytic treatment carried out by anodic electrolyzation alone.

(3) The method of producing stainless steel for use in a fuel cell separator according to item (1) or (2), in which a temperature of the solution containing fluorine is 40° C. or higher.

(4) The method of producing stainless steel for use in a fuel cell separator according to any one of items (1) to (3), in which the solution containing fluorine is hydrofluoric acid or a mixture of nitric acid and hydrofluoric acid having a hydrofluoric acid concentration [HF] (mass %) and a nitric acid concentration [$HNO_3$] (mass %) satisfying the relationship: $[HF] \geq 0.8 \times [HNO_3]$ ([$HNO_3$] includes 0).

(5) The method of producing stainless steel for use in a fuel cell separator according to any one of items (1) to (3), in which the solution containing fluorine is hydrofluoric acid or a mixture of nitric acid and hydrofluoric acid having a hydrofluoric acid concentration [HF] (mass %) and a nitric acid concentration [$HNO_3$] (mass %) satisfying the relationship: $[HF] \geq 1.7 \times [HNO_3]$ ([$HNO_3$] includes 0).

(6) The method of producing stainless steel for use in a fuel cell separator according to any one of items (1) to (3), in which the solution containing fluorine is hydrofluoric acid or a mixture of nitric acid and hydrofluoric acid having a hydrofluoric acid concentration [HF] (mass %) and a nitric acid concentration [$HNO_3$] (mass %) satisfying the relationship: $[HF] \geq 5.0 \times [HNO_3]$ ([$HNO_3$] includes 0).

(7) A stainless steel for use in a fuel cell separator produced by the method producing stainless steel for use in a fuel cell separator described in any one of items (1) to (6).

(8) A fuel cell separator using the stainless steel for use in a fuel cell separator described in item (7).

(9) A fuel cell using the fuel cell separator described in item (8).

Herein, a mixture of nitric acid and hydrofluoric acid refers to a mixed liquid of hydrofluoric acid and nitric acid.

Stainless steel having excellent conductivity and durability for use in a fuel cell separator can be stably obtained at low cost.

Even when stainless steel is dissolved due to immersion in a solution containing fluorine ions and then Fe ions having a concentration of 0.04 g/l or higher are mixed in the solution, an effect of lowering contact resistance will not disappear, resulting in stable production.

Instead of expensive carbon or gold plating conventionally used, our stainless steel is used and, thereby an inexpensive fuel cell can be provided, resulting in the possibility of accelerating widespread use of fuel cells.

Figure 1:
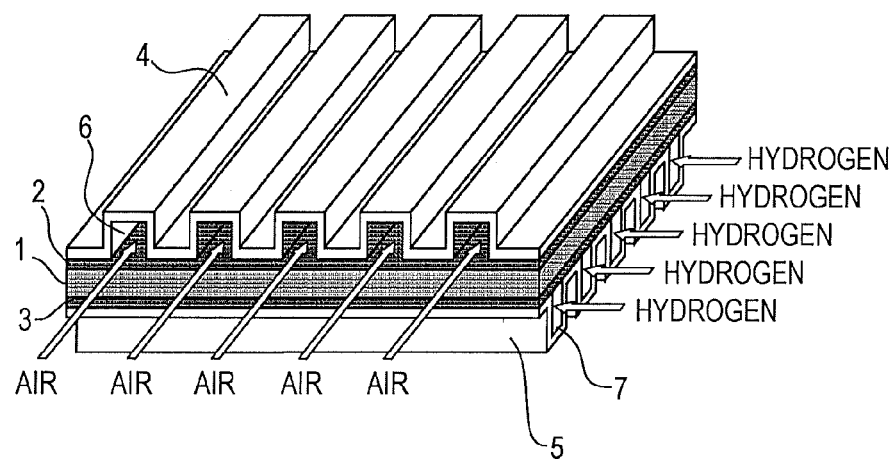
FIG. 1 is a schematic view illustrating the fundamental structure of a fuel cell.

REFERENCE SIGNS LIST 1 membrane-electrode assembly
2 gas diffusion layer
3 gas diffusion layer
4 separator
5 separator
6 air flow path
7 hydrogen flow path

DETAILED DESCRIPTION

Our methods, stainless steels, separators and fuel cells will specifically be described below.

Initially, stainless steel will be described below.

There is no particular limitation as to what type of stainless steel may be used as a substrate as long as it has corrosion resistance which is required in the operating environment of a fuel cell, and any one of ferritic stainless steel, austenitic stainless steel, and duplex stainless steel can be used. However, to ensure a minimally required corrosion resistance, 16 mass % or more, preferably 18 mass % or more of Cr should be included.

Specifically preferable component compositions with respect to ferritic stainless steel, austenitic stainless steel, and duplex stainless steel are described as follows. Herein, the expression of "%" with respect to a component refers to mass % unless otherwise specified.

(1) Preferable Component Composition of Ferritic Stainless Steel

C: 0.03% or less

Since C combines with Cr in steel and thereby decreases corrosion resistance, a smaller C content is preferable, but a content of 0.03% or less does not markedly decrease corrosion resistance. Therefore, the C content is preferably 0.03% or less and more preferably 0.015% or less.

Si: 1.0% or less

Si is an element used for deoxidation. However, since excessive content of Si decreases ductility, the Si content is preferably 1.0% or less and more preferably 0.5% or less.

Mn: 1.0% or less

Since Mn combines with S to form MnS and thereby decreases corrosion resistance, the Mn content is preferably 1.0% or less and more preferably 0.8% or less.

S: 0.01% or less

As described above, since S combines with Mn to form MnS and thereby decreases corrosion resistance, the S content is preferably 0.01% or less and more preferable 0.008% or less.

P: 0.05% or less

Since P decreases ductility, a smaller P content is preferable, but a P content of 0.05% or less does not markedly decrease ductility. Therefore, the content is preferably 0.05% or less and more preferably 0.04% or less.

Al: 0.20% or less

Al is an element used for deoxidation. However, since excessive content of Al decreases ductility, the Al content is preferably 0.20% or less and more preferably 0.15% or less.

N: 0.03% or less

Since N combines with Cr in steel and thereby decreases corrosion resistance, a smaller N content is preferable, but a N content of 0.03% or less does not result in a marked decrease in corrosion resistance. Therefore, the content is preferably 0.03% or less and more preferably 0.015% or less.

Cr: 16% or more

Since Cr is a required element for stainless steel to maintain corrosion resistance, the Cr content needs to be 16% or more to obtain this effect. When the Cr content is less than 16%, durability for long-term use as a separator is not realized. In particular, when an environmental change during use is severe, the Cr content is preferably 18% or more and more preferably 20% or more. On the other hand, when the Cr content is more than 40%, workability markedly degrades. Therefore, when workability is emphasized, the Cr content is preferably 40% or less and more preferably 35% or less.

At least one selected from Nb, Ti, and Zr is set to be 1% or less in total. Any one of Nb, Ti, and Zr is a useful element to stabilize C and N in steel as a carbide and a nitride, respectively, or as a carbonitride to improve corrosion resistance. However, when more than 1.0% is included, ductility markedly degrades. Therefore, in any case of single addition or combined addition using these elements, the content of the element or elements is limited to 1.0% or less. Herein, to sufficiently produce an adding effect of these elements, a content of 0.02% or more is preferable.

The required components have been described hereinbefore. In addition thereto, the following components may be appropriately contained.

Mo: 0.02% or more and 4.0% or less

Mo is an element effective to improve corrosion resistance, specifically, localized corrosion of stainless steel. To obtain this effect, a Mo content of 0.02% or more is preferable. On the other hand, when the Mo content is more than 4.0%, ductility markedly decreases, and therefore an upper limit thereof is preferably 4.0% and more preferably 2.0% or less.

Further, to improve corrosion resistance, additionally, 1.0% or less of each of Ni, Cu, V, and W may be contained. Still further, to enhance hot workability, 0.1% or less of each of Ca, Mg, REM (Rare Earth Metals), and B may also be contained.

Fe and unavoidable impurities account for the remainder. Among the unavoidable impurities, the O (oxygen) content is preferably 0.02% or less.

(2) Preferable Component Composition of Austenitic Stainless Steel

C: 0.08% or less

C reacts with Cr in austenitic stainless steel for use in a separator and as a result forms a compound and deposits on a grain boundary as Cr carbide, resulting in a decrease in corrosion resistance. Therefore, a smaller C content is preferable, and a C content of 0.08% or less does not markedly degrade corrosion resistance. Accordingly, the C content is preferably 0.08% or less and more preferably 0.03% or less.

Cr: 16% or more

Cr is an element that is required to secure fundamental corrosion resistance in an austenitic stainless steel sheet. When the Cr content is less than 16%, durability for long-term use as a separator is not achieved. Therefore, the Cr content is set to be 16% or more. On the other hand, when there is a Cr content of more than 30%, it is difficult to obtain an austenitic structure. Accordingly, the Cr content is preferably 30% or less and more preferably 18% or more and 26% or less.

Mo: 0.1% or more and 10.0 or less

Mo is an element effective in inhibiting localized corrosion such as crevice corrosion of austenitic stainless steel for use in a separator. To obtain this effect, the Mo content is required to be 0.1% or more. On the other hand, when the Mo content is more than 10.0%, embrittlement of stainless steel for use in a separator markedly occurs, resulting in a decrease in productivity. Therefore, the Mo content is preferably 0.1% or more to 10.0% or less and more preferably 0.5% or more and 7.0% or less.

Ni: 7% or more and 40% or less

Ni is an element that stabilizes an austenitic phase. When the Ni content is less than 7%, an effect of stabilizing the austenitic phase is not obtained. On the other hand, when the Ni content is more than 40%, Ni is excessively consumed, resulting in an increase in cost. Therefore, the content is preferably 7% or more and 40% or less.

In the austenitic stainless steel for use in a separator, in addition to the above-mentioned C, Cr, Mo, and Ni, the following elements may be included as appropriate.

N: 2.0% or less

N effectively inhibits localized corrosion of austenitic stainless steel for use in a separator. However, since it is industrially difficult to have a N content of more than 2.0%, the content is preferably 2.0% or less. Further, in a common refining method, in the case of a N content of more than 0.4%, it takes a long period of time to add N in a steel making stage for the stainless steel used in a separator, resulting in a decrease in productivity. Therefore, from a cost point of view, the N content is preferably 0.4% or less and more preferably 0.01% or more and 0.3% or less.

Cu: 0.01% or more and 3.0% or less

Cu is an element that improves the corrosion resistance of austenitic stainless steel for use in a separator. To obtain such an effect, the Cu content is preferably 0.01% or more. However, when the Cu content is more than 3.0%, hot workability degrades, resulting in a decrease in productivity. Therefore, when Cu is included, the Cu content is preferably 3.0% or less and more preferably 0.01% or more and 2.5% or less.

Si: 0.01% or more and 1.5% or less

Si is an element that is effective for deoxidation and is added at the refining stage of austenitic stainless steel for use in a separator. To obtain such an effect, the Si content is preferably 0.01% or more. However, excessive content of Si hardens stainless steel for use in a separator, resulting in a decrease in ductility. Therefore, when Si is included, the Si content is preferably 1.5% or less and more preferably 0.01% or more and 1.0% or less.

Mn: 0.001% or more and 2.5% or less

Since Mn combines with unavoidably mixed S and therefore has an effect of reducing solid-solution S in austenitic stainless steel for use in a separator, Mn is an element that is effective in inhibiting grain boundary segregation of S and thus prevents breakage during hot rolling. Such an effect is exhibited when a Mn content is 0.001% or more and 2.5% or less. Therefore, when Mn is included, the Mn content is preferably 0.001% or more and 2.5% or less and more preferably 0.001% to 2.0%.

At least one of Ti, Nb, V, and Zr is set to be 0.01% to 0.5% in total.

Any one of Ti, Nb, V, and Zr combines with C in austenitic stainless steel to form a carbide. In this manner, Ti, Nb, V, and Zr stabilize C and therefore are elements effective to improve the grain boundary corrosion resistance of austenitic stainless steel for use in a separator. In particular, when the C content is 0.08% or less, an effect of improving corrosion resistance in the case of containing at least any one of Ti, Nb, V, and Zr is exhibited in any case of singly containing or multiply containing 0.01% or more in total of Ti, Nb, V, and Zr.

On the other hand, in any case of singly containing or multiply containing more than 0.5% in total of Ti, Nb, V, and Zr, the above effect is saturated. Therefore, in the case of containing Ti, Nb, V, or Zr, the content of at least one of these elements is preferably 0.01% or more and 0.5% or less in total.

Other than the above-mentioned elements, 0.1% or less of each of Ca, Mg, B, and rare-earth elements (so-called REM) may be included to enhance the hot workability of austenitic stainless steel for use in a separator. For deoxidation at the refining stage, 0.2% or less of Al may be included.

Fe and unavoidable impurities account for the remainder. Among the unavoidable impurities, the O (oxygen) content is preferably 0.02% or less.

(3) Preferable Component Composition of Duplex Stainless Steel

C: 0.08% or less

C combines with Cr to form a compound and is deposited on a grain boundary as Cr carbide, resulting in a decrease in corrosion resistance. Therefore, a smaller content of C is preferable, and a C content of 0.08% or less does not markedly degrade corrosion resistance. Accordingly, the C content is preferably 0.08% or less and more preferably 0.03% or less.

Cr: 16% or more

Cr is an element that is required to secure fundamental corrosion resistance in a duplex stainless steel sheet. When the Cr content is less than 16%, durability for long-term use as a separator is not achieved. Therefore, the C content is set to be 16% or more. On the other hand, when there is a Cr content of more than 30%, it is difficult to obtain a duplex structure (hereinafter, referred to as a "duplex structure having a ferritic phase and an austenite phase" unless otherwise specified). Accordingly, the Cr content is preferably 30% or less and more preferably 20% to 28%.

Mo: 0.1% to 10.0%

Mo is an element effective in inhibiting localized corrosion such as crevice corrosion. To obtain this effect, the Mo content is required to be 0.1% or more. On the other hand, when the Mo content is more than 10.0%, embrittlement of stainless steel markedly occurs, resulting in a decrease in productivity. Therefore, the Mo content is preferably 0.1% or more and 10.0% or less and more preferably 0.5% or more and 7.0% or less.

Ni: 1% to 10%

Ni is an element to stabilize an austenitic phase. When the Ni content is less than 1%, the austenitic phase is difficult to form and, as a result, it is difficult to obtain a duplex structure. On the other hand, when the Ni content is more than 10%, it is difficult to form a ferritic phase and, as a result, it is difficult to obtain a duplex structure. Therefore, the Ni content is preferably 1% or more and 10% or less.

In the duplex stainless steel for use in our separator, in addition to the above-mentioned C, Cr, Mo, and Ni, the following elements may be included as appropriate.

N: 2.0% or less

N is an element that inhibits localized corrosion of duplex stainless steel for use in a separator. However, since it is industrially difficult to have a N content of more than 2.0%, an upper limit of 2.0% is preferably set. Further, in a common steel making method, in the case of a N content of more than 0.4%, it takes a long period of time to add N in the stainless steel used in a separator, resulting in a decrease in productivity. Therefore, from a cost point of view, the N content is preferably 0.4% or less and more preferably 0.01% to 0.3%.

Cu: 3.0% or less

Cu is an element that improves the corrosion resistance of duplex stainless steel for use in a separator. To obtain such an effect, the Cu content is preferably 0.01% or more. However, when the Cu content is more than 3.0%, hot workability degrades, resulting in a decrease in productivity. Therefore, when Cu is included, the Cu content is preferably 3.0% or less and more preferably 0.01% or more and 2.5% or less.

Si: 1.5% or less

Si is an element effective for deoxidation and is added at the refining stage of duplex stainless steel for use in a separator. To obtain such an effect, the Si content is preferably 0.01% or more. However, excessive content of Si hardens stainless steel for use in a separator, resulting in a decrease in ductility. Therefore, when Si is included, the Si content is preferably 1.5% or less and more preferably 0.01% or more and 1.0% or less.

Mn: 0.001% or more and 2.5% or less

Since Mn combines with unavoidably mixed S and therefore has an effect of reducing solid-solution S in duplex stainless steel for use in a separator, Mn is an element effective in inhibiting grain boundary segregation of S and thus prevents breakage during hot rolling. Such an effect is exhibited when a Mn content is 0.001% or more and 2.5% or less. Therefore, in the case of containing Mn, the Mn content is preferably 0.001% or more and 2.5% or less and more preferably 0.001% or more and 2.0% or less.

At least one of Ti, Nb, V, and Zr is set to be 0.01% to 0.5% in total.

Any one of Ti, Nb, V, and Zr combines with C in duplex stainless steel to form a carbide. In this manner, Ti, Nb, V, and Zr fix C and therefore are elements effective to improve the grain boundary corrosion resistance of duplex stainless steel for use in a separator. In particular, when the C content is 0.08% or less, an effect of improving corrosion resistance in the case of containing at least any one of Ti, Nb, V, and Zr is exhibited in any case of singly containing or multiply containing 0.01% or more in total of Ti, Nb, V, and Zr.

On the other hand, in any case of singly containing or multiply containing more than 0.5% in total of Ti, Nb, V, and Zr, the above effect is saturated. Therefore, in the case of containing Ti, Nb, V, or Zr, the content of at least one of these elements is preferably 0.01% to 0.5% in total.

Other than the above-mentioned elements, 0.1% or less of each of Ca, Mg, B, and rare-earth elements (so-called REM) may be included to enhance the hot workability of duplex stainless steel for use in a separator, and for deoxidation at the refining stage, 0.2% or less of Al may be included.

Fe and unavoidable impurities account for the remainder. Among the unavoidable impurities, the O (oxygen) content is preferably 0.02% or less.

Stainless steel having excellent conductivity and durability for use in a fuel cell separator is obtained by subjecting the above-mentioned stainless steel to electrolytic treatment and immersion treatment in a solution containing fluorine.

It is important to carry out electrolytic treatment prior to immersion treatment in a solution containing fluorine. The electrolytic treatment reforms a film formed in a process of producing stainless steel to easily exhibit an effect of reducing contact resistance via the immersion treatment in a solution containing fluorine. In addition, even when Fe ions are mixed in the solution containing fluorine, the effect of reducing contact resistance tends not to disappear. The electrolytic treatment and the immersion treatment are preferably carried out continuously, but cleaning to an extent that a surface is not markedly deteriorated may be carried out between the electrolytic treatment and the immersion treatment. Further, after the immersion treatment, cleaning to the extent that the surface is not markedly deteriorated may be carried out. The cleaning includes immersion in an alkali or acid.

The electrolytic treatment is preferably carried out by anodic electrolyzation or by a combination of anodic electrolyzation and cathodic electrolyzation. Further, anodic electrolytic quantity Qa and cathodic electrolytic quantity Qc preferably satisfy the relationship: Qa≥Qc. When the electrolytic treatment is carried out by anodic electrolyzation alone, the relationship: Qc=0 is satisfied. Qa is the product of current density and treating time in anodic electrolyzation, and Qc is the product of current density and treating time in cathodic electrolyzation. The electrolytic treatment preferably includes anodic electrolyzation and this method is not limited. Alternating electrolyzation may be applied, but in the case of Qa<Qc, due to re-adhesion of eluted components, an effect of reducing contact resistance by the following immersion treatment tends to be insufficient. Therefore, the relationship: Qa≥Qc is preferably satisfied.

In the immersion treatment, the temperature of a solution containing fluorine is preferably 40° C. or higher. In the case where the temperature is lower than 40° C., it is difficult to realize an effect of reducing contact resistance and therefore increased treating time is required to obtain a sufficient effect. An upper limit of the temperature of the solution is not specifically limited, but is, however, preferably 90° C. or lower from, for example, a safety point of view.

Figure 2:
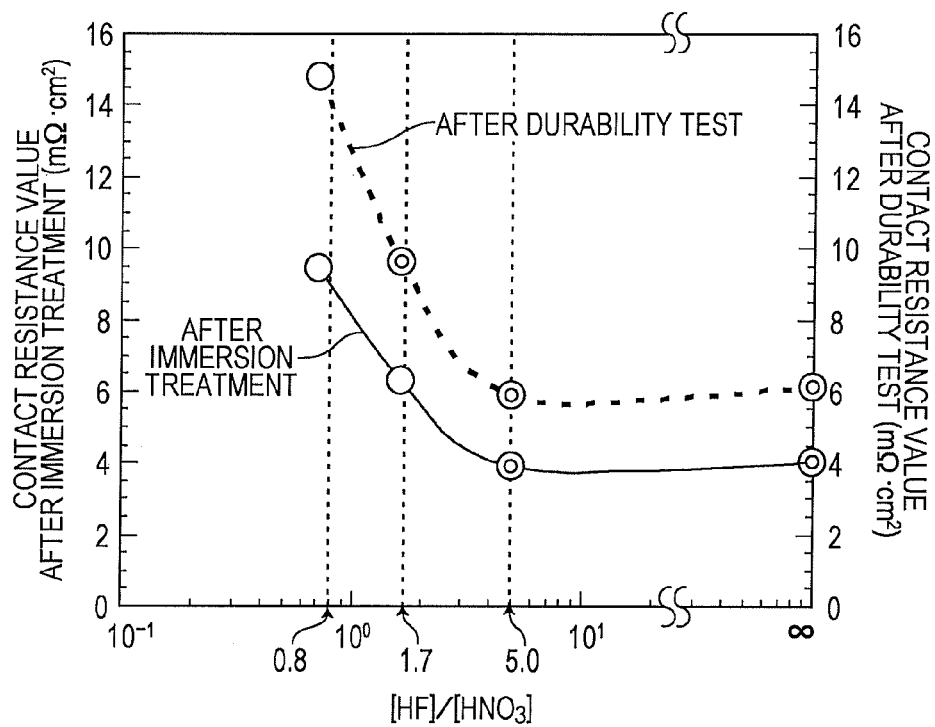
FIG. 2 is a figure representing the relationship among [HF]/[$HNO_3$], a contact resistance value after immersion treatment, and a contact resistance value after durability evaluation.

Further, the solution containing fluorine is preferably hydrofluoric acid or a mixture of nitric acid and hydrofluoric acid due to its marked effect, and the hydrofluoric acid concentration [HF] (mass %) and the nitric acid concentration [HNO$_3$] (mass %) preferably satisfy the relationship: [HF]≥0.8×[HNO$_3$]. A mixture of nitric acid and hydrofluoric acid refers to a mixed liquid of hydrofluoric acid and nitric acid. When no nitric acid is contained in the solution containing fluorine, [HNO$_3$] is designated to be 0. FIG. 2 is a figure representing the relationship among [HF]/[HNO$_3$], a contact resistance value after immersion treatment, and a contact resistance value after durability evaluation. In FIG. 2, the measurement method and evaluation criteria for the contact resistance value after immersion treatment and the contact resistance value after durability evaluation are the same as in EXAMPLE 1 to be described later. As is evident from FIG. 2, the contact resistance value after immersion treatment and the contact resistance value after durability evaluation are evaluated as "⊙" (good) and "○" (good) in the case of [HF]≥0.8×[HNO$_3$]; "⊙" (good) and "⊙" (excellent) in the case of [HF]≥1.7×[HNO$_3$]; and "⊙" (excellent) and "⊙" (excellent) in the case of [HF]≥5.0×[HNO$_3$], respectively. The reason for this is thought to be that in the case of [HF]<0.8×[HNO$_3$], stainless steel is passivated and, as a result, it is difficult to realize an effect of reducing contact resistance. According to the above results, [HF]≥0.8×[HNO$_3$] is satisfied, [HF]≥1.7×[HNO$_3$] is preferably satisfied, and [HF]≥5.0×[HNO$_3$] is more preferably satisfied.

With respect to the evaluation of the contact resistance value here, less than 5 mΩ·cm$^2$, 5 mΩ·cm$^2$ or more and less than 10 mΩ·cm$^2$, and 10 mΩ·cm$^2$ or more are determined to be excellent (⊙), good (○), and poor (X) in the case prior to durability evaluation, respectively; and less than 10 mΩ·cm$^2$, 10 mΩ·cm$^2$ or more and less than 15 mΩ·cm$^2$, 15 mΩ·cm$^2$ or more and less than 20 mΩ·cm$^2$, and 20 mΩ·cm$^2$ or more are determined to be excellent (⊙), good (○), fair (Δ), and poor (X) in the case after durability evaluation, respectively.

Under conditions other than the above ones, electrolytic treatment is preferably carried out in an acid containing 0.5 mass % or more of sulfuric acid. Electrolytic treatment in the acid containing sulfuric acid is advantageous to reform a film of stainless steel, and the concentration of sulfuric acid is preferably 0.5 mass % or higher. When the concentration of sulfuric acid is lower than 0.5 mass %, the film of stainless steel tends to be inadequately reformed. The upper limit of the concentration of sulfuric acid is not specifically limited. However, since the above effect is saturated with excessive addition of sulfuric acid, the concentration of sulfuric acid is preferably 50 mass % or lower and more preferably 1.0 to 40 mass %.

Further, electrolytic treatment in a solution containing a salt is also advantageous to reform a film of stainless steel, and the concentration of the solution containing a salt is preferably 5 mass % or higher. At a concentration lower than 5 mass %, the film tends to be inadequately reformed. As the salt, for example, sodium sulfate is advantageously applicable. However, other than this, any salt having large solubility in water is usable. The upper limit of the concentration of the salt is not specifically limited, and the salt may be included up to the upper limit of its solubility. However, since even with excessive addition of the salt, the above effect is saturated, the salt concentration is preferably 40 mass % or lower and more preferably 8 to 30 mass %.

The method of producing ferritic stainless steel, austenitic stainless steel, or duplex stainless steel serving as a substrate is not specifically limited by production conditions, and may be based on a conventionally well-known method. However, the following will be described as preferable production conditions.

A steel ingot having a preferably prepared component composition is heated to 1100° C. or higher and then hot-rolled, followed by annealing at a temperature of 800 to 1100° C. and repetitive cold rolling and annealing to produce a stainless steel sheet. The sheet thickness of the thus-obtained stainless steel sheet is preferably about 0.02 to 0.8 mm. It is efficient to carry out final annealing, electrolytic treatment, and immersion in a solution containing fluorine online continuously. However, on the other hand, it is also possible to carry out a part or all of the processes off-line independently and perform cleaning between these processes.

EXAMPLES

Example 1

Steel having the chemical composition listed in Table 1 was refining in a vacuum melting furnace and the thus-obtained steel ingot was heated to 1200° C., followed by hot rolling to produce a hot-rolled sheet having a sheet thickness of 5 mm. The thus-obtained hot-rolled sheet was annealed at 900° C. and descaled by pickling, followed by repetitive cold rolling and annealing/pickling to produce a cold-rolled sheet having a sheet thickness of 0.7 mm. Thereafter, in sulfuric acid of 30° C. having a concentration of 2 mass %, a part of the sample was subjected to electrolytic treatment in the sequential order of +2 A/dm$^2$×1 sec→−2 A/dm$^2$×1 sec→+2 A/dm$^2$×1 sec→−2 A/dm$^2$×1 sec→+2 A/dm$^2$×1 sec (+ represents anodic electrolyzation, and − represents cathodic electrolyzation) and thereafter to immersion treatment (treatment time: 90 sec) in a mixed solution of a mixture of nitric acid and hydrofluoric acid of 55° C. having 5 mass % HF+1 mass % HNO$^3$ in which Fe was present in an amount of 0 to 1.0 g/l. The Fe concentration in the mixed solution of a mixture of nitric acid and hydrofluoric acid is changed to increase the immersion treatment quantity and thereby, an increase of an amount of Fe mixed in the solution is simulated.

Treatment conditions of samples and contact resistance values after immersion treatment are shown in Table 2. Further, a test piece having a size of 30 mm×30 mm was cut out from a sample after undergoing contact resistance measurement and degreased with acetone, and thereafter subjected to a durability evaluation test by being held for 20 hours at 0.8 V vs. SHE (standard hydrogen electrode) in sulfuric acid (80° C.) of pH 3 containing 2 ppm of Cl where an operating environment of a fuel cell was simulated to evaluate a contact resistance value after the durability evaluation test. The obtained results are shown in Table 3.

With respect to the contact resistance, a sample was sandwiched between two pieces of carbon paper (TGP-H-120, produced by Toray Industries, Inc.) and further an electrode in which a copper sheet was subjected to gold plating was brought into contact on both sides thereof. Then, current was allowed to flow with a pressure of 20 kgf/cm$^2$ per unit area and the potential difference between the sample and one electrode was measured to calculate electric resistance. A value obtained by multiplying the measured value by an area of a contact face was designated as the contact resistance. In the case prior to durability evaluation, less than 5 mΩ·cm$^2$, 5 mΩ·cm$^2$ or more and less than 10 mΩ·cm$^2$, and 10 mΩ·cm$^2$ or more were determined to be excellent (⊙), good (○), and poor (X), respectively; and in the case after durability evaluation, less than 10 mΩ·cm$^2$, 10 mΩ·cm$^2$ or more and less than 15 mΩ·cm$^2$, 15 mΩ·cm$^2$ or more and less than 20 mΩ·cm$^2$, and 20 mΩ·cm$^2$ or more were determined to be excellent (⊙), good (○), fair (Δ) and poor (X), respectively.

In our methods and stainless steels, in any one of the cases prior to durability evaluation (after immersion treatment) and after durability evaluation, lower contact resistance and favorable conductivity are realized and also excellent durability is achieved.

As is evident from FIG. 2, the contact resistance of a sample having been subjected to no electrolytic treatment became poor when the Fe ion concentration in a mixture of nitric acid and hydrofluoric acid was 0.04 g/l or higher.

In addition, as is evident from FIG. 3, the contact resistance of a sample having been subjected to no electrolytic treatment also became poor after durability evaluation when the Fe ion concentration in a mixture of nitric acid and hydrofluoric acid was 0.04 g/l or higher.

Example 2

Steel having the chemical composition listed in Table 4 was melted in the vacuum melting furnace and the thus-obtained steel ingot was heated to 1200° C., followed by hot rolling to produce a hot-rolled sheet having a sheet thickness of 5 mm. The thus-obtained hot-rolled sheet was annealed at a temperature of 900 to 1100° C. and descaled by pickling, followed by repetitive cold rolling and annealing/pickling to produce a cold-rolled sheet having a sheet thickness of 0.7 mm. Thereafter, electric treatment was carried out under various conditions and thereafter immersion treatment (treatment time: 90 sec) in hydrofluoric acid or a mixture of nitric acid and hydrofluoric acid containing 1.0 g/l of Fe ions was carried out. Conditions for the electrolytic treatment and the immersion treatment are shown in Table 5. Contact resistance values after immersion treatment are shown in Table 6.

Further, a test piece having a size of 30 mm×30 mm was cut out from a sample after contact resistance measurement and degreased with acetone, and then subjected to a durability evaluation test by being held for 20 hours at 0.8 V vs. SHE in sulfuric acid (80° C.) of pH 3 containing 2 ppm of Cl where an operating environment of a fuel cell was simulated to evaluate a contact resistance after the durability evaluation test. The obtained results are shown in Table 6. Herein, the measurement method of the contact resistance is the same as in EXAMPLE 1.

As is evident from Tables 5 and 6, in the scope of our methods and stainless steels, in any one of the cases prior to durability evaluation (after immersion treatment) and after durability evaluation, lower contact resistance and favorable conductivity are realized and also excellent durability is achieved.

TABLE 1

| Steel symbol | Chemical composition (mass %) | | | | | | | | Remarks |
|---|---|---|---|---|---|---|---|---|---|
| | C | Si | Mn | P | S | Ni | Cr | N | |
| a | 0.009 | 0.15 | 0.21 | 0.022 | 0.004 | 0.1 | 21.2 | 0.01 | Compliant steel |

TABLE 2

| Sample No. | Steel symbol | Electrolytic treatment (Yes or No) | Fe ion concentration in nitric-fluorinated acid (g/l) | Conductivity | | Remarks |
|---|---|---|---|---|---|---|
| | | | | Contact resistance value (mΩ·cm$^2$) | Evaluation | |
| 1 | a | Yes | 0.00 | 4.1 | ⊙: Excellent | Inventive example |
| 2 | a | Yes | 0.04 | 4.2 | ⊙: Excellent | Inventive example |
| 3 | a | Yes | 0.10 | 4.0 | ⊙: Excellent | Inventive example |

TABLE 2-continued

| Sample No. | Steel symbol | Electrolytic treatment (Yes or No) | Fe ion concentration in nitric-fluorinated acid (g/l) | Conductivity Contact resistance value (mΩ·cm²) | Evaluation | Remarks |
|---|---|---|---|---|---|---|
| 4 | a | Yes | 0.50 | 3.7 | ⊚: Excellent | Inventive example |
| 5 | a | Yes | 1.00 | 4.3 | ⊚: Excellent | Inventive example |
| 6 | a | No | 0.00 | 4.4 | ⊚: Excellent | Reference example |
| 7 | a | No | 0.04 | 54.9 | X: Poor | Comparative example |
| 8 | a | No | 0.10 | 55.2 | X: Poor | Comparative example |
| 9 | a | No | 0.50 | 55.4 | X: Poor | Comparative example |

*Current conditions (+ represents anodic electrolyzation and − represents cathodic electrolyzation) +2 A/dm² × 1 sec→−2 A/dm² × 1 sec→+2 A/dm² × 1 sec→−2 A/dm² × 1 sec→+2 A/dm² × 1 sec
Qa: 6 C/dm²,
Qc: 4 C/dm²

TABLE 3

| Sample No. | Durability Contact resistance value after durability evaluation (mΩ·cm²) | Evaluation | Remarks |
|---|---|---|---|
| 1 | 6.2 | ⊚: Excellent | Inventive example |
| 2 | 6.2 | ⊚: Excellent | Inventive example |
| 3 | 6.3 | ⊚: Excellent | Inventive example |
| 4 | 5.4 | ⊚: Excellent | Inventive example |
| 5 | 6.9 | ⊚: Excellent | Inventive example |
| 6 | 7.1 | ⊚: Excellent | Reference example |
| 7 | 151.3 | X: Poor | Comparative example |
| 8 | 167.4 | X: Poor | Comparative example |
| 9 | 153.0 | X: Poor | Comparative example |

TABLE 4

| Steel symbol | Chemical composition (mass %) | | | | | | | | | Remarks |
| | C | Si | Mn | P | S | Ni | Cr | Mo | N | |
|---|---|---|---|---|---|---|---|---|---|---|
| a | 0.009 | 0.15 | 0.21 | 0.022 | 0.004 | 0.1 | 21.2 | — | 0.01 | Compliant steel |
| b | 0.012 | 0.32 | 0.94 | 0.023 | 0.003 | 8.5 | 17.9 | — | 0.03 | Compliant steel |
| c | 0.062 | 0.31 | 0.75 | 0.028 | 0.005 | 4.3 | 24.1 | 1.81 | 0.08 | Compliant steel |
| d | 0.020 | 0.37 | 0.53 | 0.023 | 0.003 | 0.1 | 15.3 | — | 0.03 | Comparative example |

TABLE 5

| Sample No. | Steel symbol | Electrolytic treatment Liquid composition | Current conditions *1 | Qa (C/dm²) | Qc (C/dm²) | Immersion treatment Liquid composition *2 | Temperature (°C.) | Remarks |
|---|---|---|---|---|---|---|---|---|
| 10 | a | 2 mass % H₂SO₄ | A | 6 | 4 | 5% HF + 1% HNO₃ | 30 | Inventive example |
| 11 | a | 2 mass % H₂SO₄ | A | 6 | 4 | 5% HF + 1% HNO₃ | 40 | Inventive example |
| 12 | a | 2 mass % H₂SO₄ | A | 6 | 4 | 5% HF | 55 | Inventive example |
| 13 | a | 2 mass % H₂SO₄ | A | 6 | 4 | 5% HF + 3% HNO₃ | 55 | Inventive example |
| 14 | a | 2 mass % H₂SO₄ | A | 6 | 4 | 5% HF + 7% HNO₃ | 55 | Inventive example |
| 15 | a | 2 mass % H₂SO₄ + 15 mass % Na₂SO₄ | A | 6 | 4 | 5% HF + 1% HNO₃ | 55 | Inventive example |
| 16 | a | 15 mass % Na₂SO₄ | A | 6 | 4 | 5% HF + 1% HNO₃ | 55 | Inventive example |
| 17 | a | 2 mass % H₂SO₄ | B | 150 | 140 | 5% HF + 1% HNO₃ | 55 | Inventive example |
| 18 | a | 2 mass % H₂SO₄ | C | 60 | 0 | 5% HF + 1% HNO₃ | 55 | Inventive example |
| 19 | a | 2 mass % H₂SO₄ | D | 4 | 6 | 5% HF + 1% HNO₃ | 55 | Inventive example |
| 20 | b | 2 mass % H₂SO₄ | A | 6 | 4 | 5% HF | 55 | Inventive example |
| 21 | b | 15 mass % Na₂SO₄ | B | 150 | 140 | 5% HF | 55 | Inventive example |
| 22 | b | 2 mass % H₂SO₄ | A | 6 | 4 | 5% HF + 3% HNO₃ | 55 | Inventive example |

TABLE 5-continued

| | | Electrolytic treatment | | | | Immersion treatment | | |
|---|---|---|---|---|---|---|---|---|
| Sample No. | Steel symbol | Liquid composition | Current conditions *1 | Qa (C/dm$^2$) | Qc (C/dm$^2$) | Liquid composition *2 | Temperature (° C.) | Remarks |
| 23 | c | 2 mass % H$_2$SO$_4$ | A | 6 | 4 | 5% HF | 55 | Inventive example |
| 24 | d | 2 mass % H$_2$SO$_4$ | A | 6 | 4 | 5% HF + 1% HNO$_3$ | 55 | Comparative example |

*1: Current conditions (+ represents anodic elecytrolyzation and − represents cathodic electrolyzation) A: +2 A/dm$^2$ × 1 sec→−2 A/dm$^2$ × 1 sec→+2 A/dm$^2$ × 1 sec→−2 A/dm$^2$ × 1 sec→+2 A/dm$^2$ × 1 sec B: (+5 A/dm$^2$ × 2 sec→−5 A/dm$^2$ × 2 sec) × 14 times→+5 A/dm$^2$ × 2 sec C: +2 mA/dm$^2$ × 30 sec D: −2 A/dm$^2$ × 1 sec→+2 A/dm$^2$ × 1 sec→−2 A/dm$^2$ × 1 sec→+2 A/dm$^2$ × 1 sec→−2 A/dm$^2$ × 1 sec
*2: % in the table refers to mass %.

TABLE 6

| | Conductivity | | Durability Contact resistance value | | |
|---|---|---|---|---|---|
| Sample No. | Contact resistance (mΩ · cm$^2$) | Evaluation | after durability evaluation (mΩ · cm$^2$) | Evaluation | Remarks |
| 10 | 9.2 | ○: Good | 18.4 | Δ: Fair | Inventive example |
| 11 | 4.9 | ◎: Excellent | 11.9 | ○: Good | Inventive example |
| 12 | 4.0 | ◎: Excellent | 6.1 | ◎: Excellent | Inventive example |
| 13 | 6.3 | ○: Good | 9.6 | ◎: Excellent | Inventive example |
| 14 | 9.4 | ○: Good | 14.8 | ○: Good | Inventive example |
| 15 | 3.9 | ◎: Excellent | 5.9 | ◎: Excellent | Inventive example |
| 16 | 4.1 | ◎: Excellent | 6.2 | ◎: Excellent | Inventive example |
| 17 | 4.0 | ◎: Excellent | 6.9 | ◎: Excellent | Inventive example |
| 18 | 4.1 | ◎: Excellent | 6.0 | ◎: Excellent | Inventive example |
| 19 | 9.3 | ○: Good | 17.7 | Δ: Fair | Inventive example |
| 20 | 3.8 | ◎: Excellent | 7.3 | ◎: Excellent | Inventive example |
| 21 | 4.0 | ◎: Excellent | 7.6 | ◎: Excellent | Inventive example |
| 22 | 7.5 | ○: Good | 9.3 | ◎: Excellent | Inventive example |
| 23 | 4.4 | ◎: Excellent | 8.4 | ◎: Excellent | Inventive example |
| 24 | 8.7 | ○: Good | 131.0 | X: Poor | Comparative example |

The invention claimed is:

1. A method of producing stainless steel for use in a fuel cell separator, wherein stainless steel containing 16 mass % or more of Cr comprising subjecting the stainless steel to electrolytic treatment and thereafter to immersion treatment in a solution containing fluorine and an Fe ion concentration of 0.04 g/l or more,
wherein the solution containing fluorine is hydrofluoric acid or a mixture of nitric acid and hydrofluoric acid having a hydrofluoric acid concentration [HF] (mass %) and a nitric acid concentration [HNO$_3$] (mass %) satisfying: [HF]≥0.8×[HNO$_3$], [HNO$_3$] including 0 with a proviso that, if [HNO$_3$] is 0, then [HF] is greater than 0, and
wherein electrolytic treatment is carried out in at least one of an acid containing 0.5 mass % or more of sulfuric acid and a solution containing 5 mass % or more of sodium sulfate.

2. The method according to claim 1, wherein the electrolytic treatment is carried out by anodic electrolyzation or by a combination of anodic electrolyzation and cathodic electrolyzation; and an anodic electrolytic quantity Qa in C/dm$^2$ and a cathodic electrolytic quantity Qc in C/dm$^2$ satisfy relationship: Qa≥Qc having relationship: Qc=0 when electrolytic treatment is carried out by anodic electrolyzation alone with a proviso that, if Qc=0, then Qa>Qc.

3. The method according to claim 1, wherein a temperature of the solution containing fluorine is 40° C. or higher.

4. The method according to claim 1, wherein the solution containing fluorine is hydrofluoric acid or a mixture of nitric acid and hydrofluoric acid having a hydrofluoric acid concentration [HF] (mass %) and a nitric acid concentration [HNO$_3$] (mass %) satisfying: [HF]≥1.7×[HNO$_3$], [HNO$_3$] including 0 with a proviso that, if [HNO$_3$] is 0, then [HF] is greater than 0.

5. The method according to claim 1, wherein the solution containing fluorine is hydrofluoric acid or a mixture of nitric acid and hydrofluoric acid having a hydrofluoric acid concentration [HF] (mass %) and a nitric acid concentration

[HNO₃] (mass %) satisfying: [HF]≥5.0×[HNO₃], [HNO₃] including 0 with a proviso that, if [HNO₃] is 0, then [HF] is greater than 0.

6. The method according to claim 2, wherein a temperature of the solution containing fluorine is 40° C. or higher.

7. The method according to claim 2, wherein the solution containing fluorine is hydrofluoric acid or a mixture of nitric acid and hydrofluoric acid having a hydrofluoric acid concentration [HF] (mass %) and a nitric acid concentration [HNO₃] (mass %) satisfying: [HF]≥1.7×[HNO₃], [HNO₃] including 0 with a proviso that, if [HNO₃] is 0, then [HF] is greater than 0.

8. The method according to claim 3, wherein the solution containing fluorine is hydrofluoric acid or a mixture of nitric acid and hydrofluoric acid having a hydrofluoric acid concentration [HF] (mass %) and a nitric acid concentration [HNO₃] (mass %) satisfying: [HF]≥1.7×[HNO₃], [HNO₃] including 0 with a proviso that, if [HNO₃] is 0, then [HF] is greater than 0.

9. The method according to claim 2, wherein the solution containing fluorine is hydrofluoric acid or a mixture of nitric acid and hydrofluoric acid having a hydrofluoric acid concentration [HF] (mass %) and a nitric acid concentration [HNO₃] (mass %) satisfying: [HF]≥5.0×[HNO₃], [HNO₃] including 0 with a proviso that, if [HNO₃] is 0, then [HF] is greater than 0.

10. The method according to claim 3, wherein the solution containing fluorine is hydrofluoric acid or a mixture of nitric acid and hydrofluoric acid having a hydrofluoric acid concentration [HF] (mass %) and a nitric acid concentration [HNO₃] (mass %) satisfying: [HF]≥5.0×[HNO₃], [HNO₃] including 0 with a proviso that, if [HNO₃] is 0, then [HF] is greater than 0.

* * * * *